United States Patent
Diaz

(10) Patent No.: US 8,772,388 B1
(45) Date of Patent: Jul. 8, 2014

(54) INTERMEDIATE RESIN BLEND FOR IMPROVED COATINGS

(71) Applicant: Nexeo Solutions, LLC, The Woodlands, TX (US)

(72) Inventor: Marcelino Diaz, Tustin, CA (US)

(73) Assignee: Nexeo Solutions, LLC, The Woodlands, TX (US)

( * ) Notice: Subject to any disclaimer, the term of this patent is extended or adjusted under 35 U.S.C. 154(b) by 0 days.

(21) Appl. No.: 14/064,742

(22) Filed: Oct. 28, 2013

(51) Int. Cl.
*C08K 5/5419* (2006.01)
*C09D 7/12* (2006.01)

(52) U.S. Cl.
CPC .................... *C09D 7/1233* (2013.01)
USPC .......................................... 524/265; 525/100

(58) Field of Classification Search
USPC .......................................... 525/100; 524/265
See application file for complete search history.

(56) References Cited

U.S. PATENT DOCUMENTS

| | | | |
|---|---|---|---|
| 5,498,670 | A | 3/1996 | Aoyama et al. |
| 6,046,295 | A | 4/2000 | Frisch, Jr. et al. |
| 6,048,910 | A | 4/2000 | Furuya et al. |
| 6,352,805 | B1 | 3/2002 | Taylor et al. |
| 6,387,519 | B1 | 5/2002 | Anderson et al. |
| 6,462,115 | B1 | 10/2002 | Takahashi et al. |
| 6,890,983 | B2 | 5/2005 | Rosano et al. |
| 7,364,774 | B2 | 4/2008 | Urscheler et al. |
| 7,842,129 | B2 | 11/2010 | Christian et al. |
| 2003/0096904 | A1 | 5/2003 | Hakuta et al. |
| 2006/0062923 | A1* | 3/2006 | Dilley et al. ............... 427/372.2 |
| 2009/0004468 | A1 | 1/2009 | Chen et al. |
| 2012/0165430 | A1 | 6/2012 | Donaldson et al. |

OTHER PUBLICATIONS

Dow Corning 87 ADditive, product information sheet, Nov. 2010.*
Osmosis in Resin Flooring., FeRFA Guidance Note No. 2, The Resin Flooring Association, www.ferfa.org.uk, ISBN: 0953802051, Jul. 2003.
Osmotic Blistering: Can It Happen to You?, Industrial Equipment News, mhtml:file://C:\Users\mbacko\AppData\Local\Microsoft\Windows\Temporary Internet Fi . . . , World Wide Web.
Dickens, Benny, 2-Part Epoxy Coatings & Osmotic Blisters, Formulators, Santa Ann, CA.

* cited by examiner

*Primary Examiner* — Margaret Moore
(74) *Attorney, Agent, or Firm* — Locke Lord, LLP

(57) ABSTRACT

The invention relates to a waterborne high solids emulsion resin system that can be formulated in a way to provide excellent water proofing, chemical resistance, scratch and mar resistance, resistance to hot tire pickup, while minimizing the possibility of osmotic blistering and being able to use any desired cosolvent to produce a one-coat, clear, high gloss coating or sealant for wood, cement, concrete, stone, stucco and cement-based substrates. Preferably, the resin system comprises ultra-fine particles of a hydrophobic acrylic latex copolymer resin having a high Tg temperature and a low coalescent demand that can produce a final coating or sealant at VOCs of 50 g/l or less. The acrylic resin is combined with an additional water resistance additive formed from an silane/siloxane emulsion blend of a type and amount that provides additional water resistance while simultaneously allowing water vapor pressure in the substrate to pass through the coating.

23 Claims, No Drawings

INTERMEDIATE RESIN BLEND FOR IMPROVED COATINGS

BACKGROUND

1. Field of the Invention

This invention generally relates to an intermediate resin blend that can be used to formulate improved coatings for various substrates and more particularly to an intermediate resin blend that can be used to manufacture a final coating that provides water, abrasion, chemical and hot tire pick up resistance while minimizing the possibility of osmotic blistering of the coating.

2. Description of Related Art

Various polymer coatings and sealants are often applied to substrates such as wood, cement, concrete, stone, stucco and cement-based substrates in order to provide beneficial properties to the substrate. One such quality often desired in a coating is the ability to provide a waterproof or water resistant coating. Other desirable characteristics of a coating or sealer is include one that is highly resistant to different types of chemicals as well as scratch and mar resistance.

One conventional method of providing water resistance to a substrate is to use a penetrating sealer. These types of sealers penetrate into the substrate to seal the surface. While providing some measure of water resistance, since these sealers do not form a film on the surface of the substrate, they are generally not able to confer much chemical and abrasion resistance. Nor are they particularly useful to change the appearance of the underlying substrate.

Another conventional method of providing the desired water resistance, in particular to a cement or concrete substrate, is to use an impermeable sealant coating that forms a film on the surface of the substrate. One such impermeable sealant is a 2-part epoxy coating. This coating uses epoxy chemistry to provide a low or no permeable coating that isolates the concrete substrate. The epoxy sealant may be used as a primer below another coating or can be tinted or used alone as a final coating.

One drawback of using an impermeable sealant coating such as a 2-part epoxy is that the coating is subject to osmotic blistering and delamination. As an initial matter, to the extent the coating is applied to a concrete slab that is on the ground and at a grade that is below the water table, there will be hydrostatic pressure against the underside of the coating that would tend to create blisters and/delaminate the coating from the concrete substrate. However, even if the concrete slab is above the water table or even above grade, it can still be subject to osmotic blistering.

Osmotic pressure is the spontaneous flow of water through a semi-permeable membrane from a dilute solution to a more concentrated solution of salts or water-soluble organics. As a result, the liquid volume of the initially more concentrated side increases until it generates a hydrostatic pressure that is equivalent to the remaining osmotic pressure. This osmotic pressure can greatly exceed the other forces present in concrete and are several orders of magnitude greater than the hydrostatic forces observed in uncoated concrete. Some reports indicate that the osmotic pressure can be as high as 3000 psi, which is much greater than the bond of epoxies and other coatings to a concrete substrate. Currently there is no test available to determine if osmotic blistering will occur in a given situation. Osmotic blistering can occur even when the moisture vapor emanating out of a 100 square foot section in 24 hour is less than 3 pounds of moisture vapor, which is considered by the construction industry to be the maximum amount permitted to emanate from a concrete slab that is to be coated or covered with an impermeable coating or flooring.

The concrete slab itself can act as semi-permeable membrane by allowing the passage of water but not larger water soluble materials. The pore size found in good quality concrete can be a suitable size (1-2*10-5 mm) to form a semi-permeable membrane. Even if the pore size is not small enough, application of a primer coat can often reduce the pore diameter sufficient for it to act as a semi-permeable membrane. The presence of water and salts or water soluble organics are typically found in concrete. Even when considered completely dry, a concrete slab will still contain up to 5% free water by weight and on average measures roughly 70% insitu relative humidity. When the concrete slab is in contact with the ground, additional water may be present from the migration of water vapor up through the slab.

The water soluble materials can be anything from the resin ingredients in the epoxy coating, materials from acid etching the concrete before coating, sodium/potassium silicates, sulfates resulting from the sulfur trioxide used in the concrete, hydrolysis products, salts present in the water or aggregate used to make the concrete, or unreacted paste. In fact, it has been known that there can be a significant increase in the soluble salt concentration at the surface of a concrete slab from which moisture is evaporating. When any water soluble materials form in a pocket between the concrete and the coating it can create a high concentration solution that draws additional water through the concrete slab thus forming osmotic blistering and delamination of the coating.

A pocket between the concrete slab and the coating can form from pre-existing pits in the concrete surface that are not adequately filled by the coating when applied. Alternatively, pockets can form as a result of hydrolysis. Corrosive hydrolytic attack can destroy chemical bonds in the sealant film that both results in the formation of a pocket as well as the necessary water soluble material to form a high concentration solution. In some cases, water in the concrete itself can exert sufficient pressure to debond a portion of the resin, especially if it is not yet fully cured, thus forming one or more pockets.

Depending on the particular context, the presence of osmotic blistering and/or delamination of the coating can range the gamut from being merely a cosmetic nuisance all the way to being a major health code violation. For example, food processing facilities are required by law and/or regulation to have their floors sealed in order to prevent microbial growth. This would mean that the presence of delamination and osmotic blistering in the coating would require that the coating be immediately stripped and the concrete floor recoated. In addition to the added cost of recoating the concrete flooring, this could result in significant additional costs due to the unscheduled facility downtime required to conduct such recoating.

There have been some attempts at addressing the problem of osmotic blistering. However, high water resistance is generally considered mutually exclusive to a high vapor passage through the film. As a result, these attempts have generally used a two layer approach where a first layer or primer attempts to minimize and/or prevent the buildup of osmotic pressure and a second topcoat layer, typically of a 2-part epoxy is used to provide the desired water resistance and other properties.

In addition to the osmotic blistering issue when trying to provide a water resistant coating or sealant, there are a number of other characteristics that are important for a coating or sealant to possess. Where the coated substrate will be subject to vehicular traffic, another concern for the polymer coating is to avoid hot tire pickup. When a vehicle has been driven for a sufficient period that its tires are hot and then parked on the coated substrate for a period of time. At this point the entire weight of the vehicle is dispersed over the relatively small surface area of the tires that are actually in contact with the coated floor. Especially since many coatings are thermoplastic in nature, the heat and pressure generated between the tire and the coated floor it is in contact with can be sufficient to delaminate the polymer coating. This results in the coating peeling off the substrate when the vehicle is next moved.

Current and proposed environmental regulations create additional challenges in addressing these issues. Current regulations limit the amount of volatile organic compounds (VOC) that are permissible in coatings as well as limiting the potential solvents or coalescent used in the coating product. The regulatory trend is to further reduce the permissible VOC levels and the particular solvents that can be used. The allowable level of VOCs as well as the particular solvents that can be used can vary based on the particular jurisdiction in which the final coating is ultimately sold.

Many of the low VOC coatings currently available achieve their low VOC values by using soft emulsion particles. Unfortunately, this generally leads to a soft film, which is not desirable for coatings used on certain substrates such as concrete. Harder coatings in general are desired for sealers as they will withstand abrasion much better as long as it is no so hard that it becomes brittle and can shatter if a heavy object were dropped on the coated substrate. If the substrate is wood or another substrate that have some natural structural movement the coating also needs to be flexible enough to move with the underlying structural movement of the substrate.

A coating's hardness can usually be predicted by the glass transition temperature (Tg) of the resin used to make the coating. A resin with a higher Tg would result in a harder coating. An old rule of thumb is that the amount of coalescing solvent required to form a fully coalesced film is determined by taking the Tg temperature of the resign in ° C. and dividing it by two. This yields the number of parts of solvent required per 100 parts of resin solids. Thus, lower VOC emulsion resin based coatings were generally achieved by using resins with lower Tg temperatures because it reduced the amount of coalescing solvent that is required. However, this also results in a softer overall coating, which is often less desirable. In contrast, resins with higher Tg values that result in harder film coatings typically require higher levels of cosolvent to coalesce, rendering it more difficult or impossible to meet current VOC requirements as well as expected future reductions in permissible VOC levels.

For a floor coating, it is also important for the final coating to have a coefficient of friction that falls within a desired range. For example, in the U.S. the 1990 American with Disabilities Act (ADA) as well as the U.S. Occupational Health and Safety Administration (OSHA) recommends a coefficient of friction (C.O.F.) rating of from 0.5 to 0.8. A lower coefficient of friction would result in a surface that is too slippery and could results in individuals slipping and losing footing on the coated substrate. In contrast, too high a coefficient of friction can result in too much adhesion and the impression that an individual's feet are "sticking" to the floor.

Thus, there remains a need for improved resin blends that can be used to form coatings or sealants on various substrates such as wood, cement, concrete, stone, stucco and cement-based substrates in order to provide beneficial properties to the substrate.

BRIEF DESCRIPTION OF THE INVENTION

It has been discovered that a waterborne high solids emulsion resin system can be formulated in such a way as to provide excellent water proofing, chemical resistance, scratch and mar resistance, resistance to hot tire pickup, while minimizing the possibility of osmotic blistering and being able to use any desired cosolvent to produce a one-coat, clear, high gloss coating or sealant for wood, cement, concrete, stone, stucco and cement-based substrates. Preferably, the resin system comprises ultra-fine particles of less than 0.1 microns of a hydrophobic acrylic latex copolymer resin that has the combination of a high Tg temperature along with a low coalescent demand in order to be able to produce a final coating or sealant at VOCs of 50 g/l or less. The acrylic resin is combined with an additional water resistance additive formed from an silane/siloxane emulsion blend of a type and amount that provides additional water resistance while simultaneously allowing water vapor pressure in the substrate to pass through the coating. The emulsion resin system further preferably contains one or more of known aliphatic plasticizers, wetting agents, defoamers and surface mar resistance additives.

DESCRIPTION OF THE PREFERRED EMBODIMENTS

The present invention can be better understood by the following discussion of the manufacture and use of certain preferred embodiments. All data disclosed below regarding time, temperature, amount of components, concentration in % by weight, etc. are to be interpreted as also including all values lying in the range of the respective measuring accuracy known to the person skilled in the art. Unless otherwise stated, technical grades of the various materials were used in the preferred embodiments.

In a preferred embodiment, the invention is composed of an intermediate resin blend system that does not contain the required coalescent (cosolvent) necessary to formulate a final coating or sealant product. This intermediate blend has the flexibility of being able to be customized in order to meet VOC requirements, other regulations, as well as other desirable characteristics for the particular jurisdiction, market and/or intended use for a particular application. Depending upon the particular jurisdiction and end use, the preferred intermediate blend is combined with the desired cosolvent to form and end product sealer or coating. Examples of potential cosolvents include ethylene glycol mono butyl ether, texanol, butyl carbitol, 1-butoxy-2-propanol (glycol ether PnB), 1-propoxy-2-propanol (glycol ether PnP), and mixtures thereof. The intermediate blend can be left as a high gloss sealant or the gloss/sheen can be lowered by adding matting agents. Similarly the coating can be left clear or tinted to a desired color through the use of pigments. Where used as a floor coating, the final coating preferably provides a coefficient of friction of from about 0.5 to about 0.8 when applied to the substrate. This allows the preferred intermediate blend to be able to be used across many jurisdictions (including the entire United States) while being customizable into a final product that satisfies a wide variety of local VOC regulations as well as customer requirements and preferences. Also, the higher solids content resulting from lower cosolvent requirements allows the final sealant or coating to provide an adequate coating on a substrate with fewer coats than other products with lower solids content.

The preferred intermediate resin blend is a mixture of a hydrophobic latex based on an acrylic polymer with ambient cross-linking and an ultra-small particle size along with a water repellency additive that provides additional water repellency while improving the ability of water vapor present in the substrate to pass through the coating. In this manner the intermediate blend can be used to formulate a final coating or sealant that is capable of both providing excellent water and chemical resistance to prevent penetration down to the substrate while at the same time providing the necessary vapor transmission up through the film to minimize or avoid osmotic blistering.

The base resin of the preferred intermediate resin blend is a hydrophobic acrylic polymer that has an ultra-low particle size. Most acrylic emulsions have particle sizes ranging from about 0.20 to about 0.40 microns. Using an acrylic resin with a particle size of less than 0.10 and more preferably about 0.07 microns allow the resin particles to penetrate into smaller diameter pores in the concrete or other substrate. For a similar reason a narrower particle size distribution is desirable. The more pores that are sealed up, the better water resistance the coating provides. Filling up smaller pores also makes it more difficult for osmotic blistering to occur. Without being bound by theory, it is currently believed that the smaller resin is able to fill up more pockets and pores in the concrete that could otherwise serve as locations for water soluble materials to collect and provide the conditions that result in osmotic blistering. Acrylic emulsions are solid acrylic resins that have been dispersed in water. They generally average between 30-60% resin solids and the remainder is usually water. The most common concentration is 45% solids. Thus, it is supplied by the manufacturer in an emulsion that has 45 weight parts of resin solids and 55% weight parts of water.

The preferred resin has a relatively high Tg value so that it creates a very hard film. A harder film is more desirable because it resists abrasion a lot better, although this must be balanced by the fact that if the film is too hard it will become brittle and be more likely to shatter if struck by a heavy object, such as if a hammer is dropped on a coated concrete floor. As a result, a resin that has a Tg value above about 45° C. is preferred to provide the best balance between hardness/abrasion resistance while remaining flexible enough to minimize the risk of shattering if impacted. Similarly if the substrate is wood, which will expand and contract across the grain with changes in humidity, the film will be required to have flexibility to be able to accommodate the structural movement of the substrate. There is a huge difference between Poplar, Pine, Cherry, Maple, Oak, etc. The key is to achieve a good balance between high Tg and flexibility so that the coating will stretch and stay adhered to the substrate. If the Tg is too high, it will not stretch as well and you have the possibility of film cohesion being higher than film adhesion and the film will delaminate. But, if the film is too low in Tg, you may end up with the other extreme where it will stretch and adhere perfectly, but being soft, when exposed to direct sunlight or hot environments, they may turn slightly thermoplastic and be more prone to picking up track marks from shoes, or absorb airborne dirt particles which become embedded in the film. While having a relatively high Tg value the preferred resin is also able to form a fully coalesced film even with cosolvents in amounts less than about 10 parts per 100 parts resin solids and preferably 5-20 parts per 100 parts resin solids.

The required amount of cosolvent required to fully coalesce the film can also be lowered by other methods. Plasticizers can be used to cut down the amount of coalescence even lower. Unfortunately, this is only useful to an extent as at higher levels of plasticizer you sacrifice attributes such as hot tire pickup resistance and chemical resistance. Also, elevating the temperature while the coating is applied and curing will also lower the coalescent demand. This is hard to do when you have a concrete floor or an installed wood deck, but it can be done if these are products that are prepainted at the OEM factory before being shipped out.

The preferred acrylic resin is the NEOCAR® Acrylic 850 resin, which is available from Arkema Coating Resins of Cary, N.C. It is a modified acrylic that cures under ambient conditions via self-cross linking and is considered a hydrophobic latex. It has a typical particle size of about 0.07 microns, a glass transition temperature (Tg) of 50° C., total solids content of 45.0 weight percent, Brookfield viscosity of 150 cP, and a minimum filming temperature of 45° C.

The preferred water repellency additive used in the preferred intermediate resin blend is a silane/siloxane emulsion blend that forms a hydrophobic silicon network in the final sealant that repels water but is permeable to water vapor coming up through the substrate. More specifically the preferred water repellency additive contains from about 15 to about 35 weight percent Silicic acid, diethoxyoctylsilyl trimethylsilyl ester and from about 10 to about 30 weight percent Triethoxyoctylsilane. It is further preferred that the water repellency additive further contains from about 3 to about 7 weight percent Dimethyl siloxane, hydroxyl-terminated and up to about 2 weight percent Polyethylene oxide lauryl ether with the balance being water.

Preferably the water repellency additive is Dow Corning Additive 87, which is available from Dow Corning of Midland, Mich. It is reported as a silane/siloxane emulsion blend with ethoxy-silanol reactive groups. According to the MSDS, the two major components in Dow Corning DC87 additive are Silicic acid, diethoxyoctylsilyl trimethylsilyl ester; Triethoxyoctylsilane. There are three other ingredients listed on their MSDS sheet, but they are at levels below 5% (those are: Polyethylene oxide lauryl ether, Aminofunctional siloxane, Ethoxylated C12-C13 alcohol). It is intended for providing water repellency and water beading in waterborne systems with minimal negative effect on vapor permeability such as in decorative paints. The additive is recommended by its manufacturer for use at concentrations of from 1.0 to 5.0 weight percent based on the total formulation. However it is currently preferred to use at least 5.0 to 6.0 weight percent of Dow Corning Additive 87 based on the total weight of the preferred intermediate resin. As discussed below in connection with Example 3, using up to 2% by weight of Dow Corning Additive 87 does not appear to provide any significant benefit with respect to water vapor transmission rate or hot tire pickup resistance as compared to the sealant without any of the additive at all. Thus, is it important to use a sufficient amount of the water repellency additive so as to improve at least the water vapor transmission rate of the overall sealant to a point where it can minimize or prevent the formation of osmotic blistering. At least with respect to the Dow Corning Additive 87, this amount appears to be preferably 5 weight percent and more preferably 6 weight percent based on the total weight of the preferred intermediate resin.

The intermediate resin blend further preferably includes a plasticizer. A plasticizer will give the final film some additional flexibility, allowing a resin with a higher Tg value to be used to create a harder film while rendering the film more resistant to shattering. It also aids in coalescing the resin and thus lowers the amount of cosolvent that is required for a particular resin blend. This assists in providing a final sealant or coating that has an overall lower VOC content than would be otherwise required. Known plasticizers include dibutyl phthalate (DBP), dioxtyl adipate, butyl benzyl phthalate (BBP), alkyd dispersion/emulsion, reactive diluents and a benzoate ester such as Eastman LC-531. It is currently preferred to use about 4 to 8 weight percent based on the total weight of the preferred intermediate resin solids, however, when other emulsions are taken into account, like those for architectural coatings, roof coatings, elastomeric coatings, etc., the preferred range can be much broader than this. The amount of plasticizer used must be balanced since increased amounts reduce the cosolvent requirement but also being to negatively affect the hot tire pickup and chemical resistance characteristics of the final film. Thus, it is preferable to use the lowest amount of plasticizer possible.

Optionally, the preferred intermediate blend includes a foam control additive. The foam control additive prevents or at least minimizes air entrapment in the coating to avoid the presence of pockets or pores that can allow water, dirt or microbes to traverse the coating and penetrate the substrate. By minimizing the presence of pockets or pores in the coating, the foam control additive also helps to some extent in minimizing locations where water soluble materials can collect, which could lead to osmotic blistering. Preferably, the foam control additive is a silicon emulsion. Currently, the most preferred foam control additive is Dow Corning Additive 62, which is reported to be a substituted siloxane emulsion. According to its MSDS, the chemical composition of Dow Corning Additive 62 is Dimethyl, methylhydroxypropyl, ethoxylated propoxylated siloxane; Polydimethylsiloxane; Dimethyl siloxane, hydroxy-terminated; and Dimethyl siloxane/silica reaction product, all in water to form the emulsified defoamer. This additive is recommended by its manufacture for use at concentrations of from about 0.05-0.5 weight percent based on the total formulation. It is currently preferred to use from about 0.25 to about 2.00 weight percent based on the total weight of the preferred intermediate resin. The concentration is based on the intermediate resin blend as the concentration based on the overall coating will vary depending upon the particular types and amounts of additional ingredients added to the intermediated resin blend, including the amount of cosolvent, any water used to dilute the end product, the presence and amounts of colorants and matting agents etc.

Optionally, the preferred intermediate blend includes a surfactant. The surfactant (can also be known as a surface wetting agent) allows the final coating to evenly flow across floors or other substrates that may still have contaminants on them while still providing a continuous film that protects and seals the substrate. This allows the coating containing the preferred intermediate blend to be used with less surface preparation, resulting in reduced labor requirements as well as reducing the possibility of coating failures due to the presence of contaminants on the substrate surface. Known surfactants include silicon-based surfactants, fluorosurfactants, polysiloxane surfactants, poly-ether siloxane, polyalkylene oxide polysiloxanes and alkyl polyglycosides. The preferred surfactant is a low molecular weight organofunctional silicone, and more particularly the Dow Corning Additive 67, which is available from Dow Corning of Midland, Mich. According to its MSDS, the chemical composition of this additive is: 3-(3-Hydroxypropyl)-heptamethyltrisiloxane, ethoxylated, Hydroxy-terminated; Polyethylene oxide monoallyl ether; and Polyethylene glycol. This additive is recommended by its manufacture for use at concentrations of from about 0.1 to 0.4 weight percent based on the total formulation. It is currently preferred to use from about 0.25 to about 2.00 weight percent based on the total weight of the preferred intermediate resin.

Optionally, the preferred intermediate blend includes a mar resistance additive. A mar resistance additive is used to impart dirt repellency and scratch resistance to the final coating or sealant. There are many known types of mar resistance additives including siloxane and many form of waxes. Particularly preferred is the use of Dow Corning Additive 56, which is reported to be an ethyl methyl methyl(2-phenylpropyl)siloxane. The additive is recommended by its manufacture for use at concentrations of from about 0.05 to 2.0 weight percent based on the weight of the total formulation. It is currently preferred to use from about 0.25 to about 2.00 weight percent based on the total weight of the preferred intermediate resin.

One attribute used in the industry to measure the water resistance of a coating is its ability to bead water on its surface. The ability to bead water on the surface of a coating measures the interfacial tension between the liquid drop and the solid surface. It is considered an indirect measure of both a surface's hydrophobicity as well as its wetting ability. These two attributes are considered to be inversely related in that improved hydrophobicity generally results in lower wetting ability. The wetting ability/hydrophobicity can be measured by looking at the contact angle, which is the angle between the baseline of a drop, e.g. the surface of the coating, and the tangent to its surface at the point of contact between the two. This measurement is most commonly done using the Sessile Drop Method which involves directly measuring the contact angle using a goniometer scale or from a photograph of the drop profile. A contact angle between 0° and 90° is considered to provide poor hydrophobicity to the surface but good wetting. A contact angle of 90° is considered to have moderate wetting ability and moderate hydrophobicity. A contact angle between 90° and 180° is considered to have poor wettability and good hydrophobicity. In addition, consumers often view the ability of a surface to form beads of water as evidence that the surface is water-proof or at least highly water resistant. Thus, a higher contact angle is preferable as it indicates an increased ability for the coating surface to bead water. Preferably the preferred intermediate blend can be used to form a coating that has contact angle greater than 100° and most preferably at least 120-140°. More preferably, the intermediate blend can form a coating that has a contact angle at least about 135° without reducing the vapor transmission rate below that of the acrylic resin alone.

The current invention can be further understood by reference to the following examples, which are provided to illustrate but not limit the invention.

Example 1

A mixing tank was charged with approximately 691 pounds of NEOCAR® 850 Acrylic resin. A variable speed mixer was set at a speed sufficient to create a vortex in the center of the tank. Approximately, 15.5 pounds of Dioctyl Adipate (DOA), approximately 55.25 pounds of Dow Corning Additive 87, approximately 6.25 pounds of Dow Corning Additive 56, approximately 6.25 pounds of Dow Corning Additive 62 and approximately 6.25 pounds of Dow Corning Additive 67 were sequentially added to the vortex within the resin in the mixing tank. The pH was checked and adjusted using aqua ammonia until a pH of 8.4-8.8 is achieved. Then approximately 70 pounds of water was added to the mixing tank and the mixture was mixed until uniform in appearance. The viscosity of the mixture was checked using a #2 Zhan Cup. Additional water was added to the mixture until the efflux time through a #2 Zhan Cup was within the range of 25-30 seconds. The resulting mixture was filtered through a 10 micron filter.

Example 2

The intermediate resin blend of Example 1 was used to form a coating to allow further testing. A total of 4 galls was prepared by missing the intermediate resin blend of Example 1 with ethylene glocolm mono butyl ether (aka 2 butoxy ethanol, glycol ether eb) cosolvent in the weight ratio of 200 weight parts of the intermediate resin blend to 10.9 parts by weight of cosolvent. A five gallon pail was filled with four gallons of the resulting final coalesced sealant was then used to conduct further tests discussed below.

The sealant was brought to a contractor's active warehouse in Arizona and tested on the concrete floor with different types of surface preparation. Labor costs amount for up to two-thirds of a contractor's cost on a particular job. Thus, the amount of surface preparation that is required for the successful application of a coating to a concrete floor can be critically important. Poor and/or inadequate surface preparation can undermine even the highest quality coating. The sealant was thoroughly mixed with an industry standard mixer attachment powered by an electric drill.

A portion of the warehouse concrete floor was divided into three sections, A, B and C. In section A, the concrete surface was heavily mechanically abraded by grinding to remove the upper layer of concrete. This represents the most labor intensive surface preparation that is typically used for concrete coatings. In section B, a more mild mechanical abrasion using conventional shot blasting was performed. In section C, the surface was not mechanically abraded at all. Rather a dilute concentration of an all-purpose cleaner was prepared and applied to the surface using a large industrial broom to scrub the surface of the existing concrete floor to degrease and remove as much surface contamination as possible.

A single coat of the sealant was applied using a roller to each of sections A, B and C of the floor. The applied coatings were inspected after 21 hours cure time, four days later and a month after being applied. The tests involved visually evaluated for gloss, flow and leveling, air entrapment and overall appearance, scratch testing with a dime, impact testing with a hammer, testing for hot tire pickup and testing the ability to bead water on the surface of the coating. The test results were the same regardless of how long the coating had been allowed to cure.

There were no physical anomalies or air entrapment in any of the sections upon visual inspection. The film in all three sections was glossy, smooth and completely transparent with no color change noticed when compared to an uncoated section of the floor that abutted the coated surface. A piece of tape was applied to each of the three coated sections and then peeled off to determine if the coating was sufficiently adhered to the concrete substrate. None of the sections evidenced any coating being removed by the tape pull-off test. An industrial hammer was used to hit the coated floor in each of the sections to determine if the coating was brittle enough to shatter or delaminate. Upon impact by the hammer, a coating will momentarily stretched or deformed. If the coating is not fully adhered to the substrate, when the impact is sufficient to deform the concrete beneath the coating the film would rebound to its original size once the head of the hammer is retracted and thus leave a pocket between the concrete substrate and coating. No embrittlement or lack of adhesion was detected in any of the three sections. In fact, the surfaces were hit so hard with the hammer that sufficient impact pressures were reached where the concrete under the head of the hammer failed and fell apart. Even then, the coating was still fully adhered to the concrete.

A US dime was rubbed back and forth across the surface of the coated floor in each section and then visually inspected to determine its scratch resistance. All six sections evidenced less scratching or marring of the surface than did the alternative product, which was a nationally distributed commercially available water based acrylic concrete floor sealer that had been previously applied and had cured for over three months.

The ability of the coatings to bead water was tested by pouring a cup of tap water onto the coated substrate in each section. A cup of water was also poured onto another section of flooring that had been coated with the same preexisting commercially available water based acrylic concrete floor sealer. All three sections of the coating of the current invention had formed a multitude of small, almost perfectly circular beads of water. In contrast, on the commercially available water based acrylic concrete floor sealer the water puddled and did not form any discernable beads.

All three of the coated sections were further tested for hot tire pickup resistance. After driving for a period of time car tires reach an elevated temperature. When the vehicle is then stopped on a coated concrete floor the entire weight of the car is focused on the four small portions of the wheels that are actually in contact with the floor. The elevated pressure and temperature can result in a portion of the coating being picked up by the tire and pulled off the substrate when the vehicle is next moved. As reported by Car and Driver Magazine in 2000, typical tires are expected to have an increase of about 50° F. after running on the highway for a half-hour. If it's a 70-degree day, this suggests a tire temperature of about 120° F. If one is driving faster, hauling a heavy load, or do not have the tires properly inflated they could get even hotter.

To test the hot tire pickup resistance of the coating, a 2013 Ford Taurus with P235H55 tires was driven at an average speed of 50-55 miles per hour around a block in a commercial zone for 30 minutes to elevate the tire temperature to its maximum. Once ever circle around the block the car was set at 40 MPH and then the brakes were applied to cause an immediate and complete stop. Due to the presence of an ABS system on the car it was not possible to create skid marks. The outdoor temperature that day was a mean of 79° F. with a high of 84° F., so the estimated tire temperature is at or above 129° F. The car's published curb weight is 4037 pounds and its estimated total weight with passengers, fuel and luggage was 4550 pounds. After driving for 30 minutes the car was immediately brought to a standing position over one of the sections of coated floor. The steering wheel was turned to each extreme five times to simulate "grinding" in of the wheel into the coating. The wheel was then placed in a straight position and the car allowed to stand for five minutes. The car was then placed in reverse gear and removed from the coated floor. The coated floor was then inspected for any damage or hot tire pickup. The test was repeated for the other two floor sections. No damage, delamination, softening, color change or other physical change was noted in any of the three floor sections.

The coatings were left applied to the sections of flooring in the warehouse and inspected a month after the initial application. The area of the warehouse where the coating was applied was a heavily travelled corridor where forklifts regularly traverse with heavy loads. After a month of use there were black forklift marks covering part of the coated test floor sections. A bucket with an all-purpose cleaner was used with an industrial broom and a mop to clean the coated surface. Even the heaviest, thickest black tire marks were able to be removed with the cleaner. Upon removal the coating was inspected and no damage was noted.

Chemical resistance was tested by pouring an eight ounce cup of solvent onto the coated floor. The solvent used was PM Acetate (CAS No. 108-65-6) (chemical name: propylene glycol monomethyl ether acetate) that has a density of 8.08 lbs./gal, and a relative evaporation rate of 0.40 where n-Butyl Acetate is 1.0. This solvent was chosen due to its strong solvency, while having a flash point that rendered it "safer" to use in an enclosed environment. The puddle was allowed to remain on the coated surface for twenty minutes. The remaining PM Acetate was then mopped up and the coating was examined. The coating did not show any signs of damage. The hardness, clarity and gloss were the same and there was no ring outlining where the perimeter of the solvent puddle had been. There was no coating wrinkling or other physical anomaly. The base resin is reported to have excellent chemical resistance to numerous materials including brake fluids, Formula 409, 30% hydrochloric acid and most household condiments such as ketchup, mustard, red wine. From this test, as well as the reported resistance of the base resin, it can be concluded that the preferred coating of the current invention has excellent chemical resistance to all categories of solvents, other chemicals and common household fluids that it might reasonably be expected to come in contact with.

Finally, a cigarette lighter was lit and the flame was applied to the coated floor for 60 seconds to determine what amount of film softening may occur when rapid heating of the coated surface takes place. After the sixty seconds were up, the flame was removed and the film was immediately felt for any residual tackiness or softness that would indicate that the film had been altered. No difference was noted.

on a steel substrate to determine the thickness of a single brushed coat. A total dry film of approximately 2 mils (0.002 inch) thick was the goal. The wood substrates were coated with a light coat of the sealer and allowed to dry before being sanded to ensure a smooth surface. Two additional coats were then applied allowing 2-3 hours drying time between coats. The cement board was also sanded down to remove any imperfections and two coats were applied in the same manner as the wood. Once dried, the coated panels were placed in a humidity chamber to cure and equalize the humidity over a period of 6-7 days. Three samples of each sealer on each type of substrate was tested and the results were averaged. The wet cup method of ASTM D1653 was the followed with the results determined by the amount of water that is lost from the scaled container. The data was analyzed from the 72 hour mark forward for a total of 22 days of information. The results are shown below in Table 1. The total loss, loss per 24 hours and loss per square foot in 24 hours each measured in grams. The water transmission rate (WVT) was measured in grains of water based on 15.43 grains per gram. The permeability rating was calculated from the following: WTV/S (R1-R2) where S is inches of HG from the reference table, R1 is the relative humidity in the dish in decimals and R2 is the relative humidity in the test chamber in decimals.

TABLE 1

| Sample | Wood | | | Cement | | |
|---|---|---|---|---|---|---|
|  | 3a | 3b | 3c | 3a | 3b | 3c |
| Total Loss | 1.69 | 1.73 | 2.69 | 1.34 | 1.30 | 1.62 |
| Loss/24 hrs. | 0.0768 | 0.0786 | 0.1222 | 0.0609 | 0.0591 | 0.0736 |
| WVT | 1.5927 | 1.6299 | 2.5342 | 1.2629 | 1.2256 | 1.5260 |
| Perm. Rating | 4.25 | 4.35 | 6.76 | 3.34 | 3.27 | 4.07 |
| Loss/Sq. Ft. in 24 hrs. | 2.48 | 2.83 | 3.94 | 1.96 | 1.90 | 2.37 |

From this example, it can be concluded that the preferred intermediate blend provides excellent hot tire pickup, water beading, flame resistance, chemical resistance, scratch and mar resistance, impact resistance, excellent adhesion and film continuity, no air entrapment, and is a clear haze-free film coating. Further, these properties and an excellent coating can be obtained even with the bare minimum surface preparation of just cleaning and degreasing the floor. In particular, the scratch resistance and water beading ability was found to be superior to a coating using a commercially available water based acrylic concrete floor sealer.

Example 3

Samples of three sealers were tested for water permeability and hot tire resistance. Each of the three samples were prepared by preparing an intermediate resin blend in accordance with the procedure set forth in Example 1 and then added a cosolvent to form a sealer as set forth in the first paragraph of Example 2. The only difference between the three sample sealers is that in Sample 3a no DC87 additive was used in the sealer at all. In Sample 3b the DC87 additive was used in an amount to form a 2% by weight of the DC87 additive based on the uncoalesced total intermediate resin blend formula weight. In Sample, 3c, the DC87 additive was used in an amount to form a 5% by weight of the DC87 additive based on the uncoalesced total intermediate resin blend formula weight.

For the water permeability test, squares of ⅜" stone cement board and ¼" thick poplar wood substrates were cut into 3.25" by 3.5" pieces. The resin blends were each first coated From this test it can be concluded that the use of 5% of the DC 87 additive is significantly superior in the permeability rating as well as the water transmission rate as compared to the use of 2% of DC 87 additive or the control which does not contain any DC 87 additive. In fact, when only 2% of the DC 87 additive is used, the resulting sealant is extremely similar to the control that does not contain any DC 87 additive. This shows that there must be an amount of DC 87 additive that is significantly more than 2 weight percent to create a material improvement in the water transmission rate of the film. The water transmission rate of the film is the property that allows water vapor present in the substrate to migrate through the coating to escape as opposed to building up between the substrate and coating which can lead to the formation of osmotic blistering. Preferably, the coating when applied to a substrate has a moisture vapor transmission rate up to 50% higher than a coating composed of just the base resin.

The three sealer samples 3a, 3b, and 3c were also tested for hot tire pickup. Smooth face concrete blocks were washed, dried and then coated twice with the sealer with 2-3 hours drying time between coats. The samples were allowed to dry under ambient conditions for 7 days before testing. Tire tread was cut into 2" by 4" pieces with the longer measurement running with the tread. The tire pieces were abraded with a wire brush on an electric drill to remove any dirt or loose rubber and then soaked in 140° F. water for at least 90 minutes. After 90 minutes the tire tread was removed from the water and placed tread down on the sealed block. A steel plate was then placed over the tire tread pieces and clamped into place with four 6" clamps. The clamps were tightened in an X fashion a little at a time to keep the steel plate as parallel as possible to the block face. The claims were tightened to 10 foot pounds of torque. The entire test apparatus was then placed in a 140° F. convection oven for a period of 90 minutes. At the end of 90 minutes, the oven was turned off and the door was left open overnight to cool the apparatus down to ambient temperatures. The next morning the apparatus was disassembled and the results were recorded.

Samples using the 3a sealant and 3b sealant had a slight amount of black transfer to the block which was easily washed off with soap and water. Both also had one or two pieces of tire tread that showed a little adhesion to the block and in fact one sample of the 3b coating had a little piece of coating that was transferred to the tire tread. In all of the samples using the 3c sealant, the tire tread pieces came off easily showing no adhesion to the substrate as well as no black transfer at all. In all samples, regardless of the sealant used, the coating was somewhat dulled where the tire treads were located. Examining the coatings under magnification the surface may have been roughened from the tire tread.

From this test it can be concluded that the 3c samples that contained 5% of the DC 87 additive provided superior hot tire pickup to either the sealant without any of the DC 87 additive as well as compared to the sealant that only had 2% of the DC 87 additive. Like the prior test, the use of 5% of the DC 87 additive provided a superior result to even the 3b samples that contained 2% of the same additive. Thus, amounts of the DC 87 additive that are above 2% and preferably 5% or higher will provide improved hot tire pick up resistance.

The above descriptions of certain embodiments are made for the purpose of illustration only and are not intended to be limiting in any manner. Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled. The resulting coated substrates were then inspected for clarity, gloss and coalescence.

What is being claimed is:

1. An intermediate resin blend useful for forming a one-coat composition for coating or sealing a substrate comprising:
    a film forming hydrophobic acrylic resin that cures under ambient conditions via self cross-linking, has an average particle size of less than about 0.1 microns and has a glass transition temperature greater than about 45° C.;
    a water repellency additive comprising silicic acid, diethoxyoctylsilyl trimethylsilyl ester and triethoxyoctylsilane in an amount sufficient to increase both the water repellency and vapor transmission rate of the acrylic resin;
    a plasticizer;
    wherein the intermediate resin blend has a coalescing requirement of from about 5 to about 15 weight percent cosolvent based on the total resin solids weight;
    wherein the blend has a vapor transmission rate greater than that of the acrylic resin alone; and
    wherein the blend is adapted to form a one-coat composition to be coated on a substrate selected from the group consisting of concrete, wood, stone, cement, stucco, cement based products and combinations thereof.

2. The blend of claim 1 wherein the acrylic resin has a mean particle size of about 0.7 and a glass transition temperature of at least about 50° C.

3. The blend of claim 1 wherein the water repellant additive comprises from about 15 to about 35 weight percent silicic acid, diethoxyoctylsilyl trimethylsilyl ester and from about 10 to about 30 weight percent triethoxyoctylsilane.

4. The blend of claim 3 wherein the water repellant additive further comprises from about 3 to about 7 weight percent dimethyl siloxane, hydroxyl-terminated and up to about 2 weight percent polyethylene oxide lauryl ether.

5. The blend of claim 1 further comprising a foam control additive, a surfactant and a mar resistance additive.

6. An intermediate resin blend useful for forming a one-coat composition for coating or sealing a substrate comprising:
    a film forming hydrophobic acrylic resin that cures under ambient conditions via self cross-linking, has an average particle size of less than about 0.1 microns and has a glass transition temperature greater than about 45° C.;
    a water repellency additive comprising silicic acid, diethoxyoctylsilyl trimethylsilyl ester and triethoxyoctylsilane in an amount sufficient to increase both the water repellency and vapor transmission rate of the acrylic resin;
    a plasticizer;
    a foam control additive;
    a surfactant;
    a mar resistance additive;
    wherein the intermediate resin blend has a coalescing requirement of from about 5 to about 15 weight percent cosolvent based on the total resin solids weight;
    wherein the blend has a vapor transmission rate greater than that of the acrylic resin alone;
    wherein the foam control additive is a substituted siloxane emulsion, the surfactant is a low molecular weight organofunctional silicone and the mar resistance additive is an ethyl methyl methyl(2-phenylpropyl) siloxane.

7. The blend of claim 6 wherein the foam control additive, the surfactant and the mar resistance additive are each present in an amount of from about 0.25 to about 2.00 weight percent based on the weight of the blend.

8. The blend of claim 6
    wherein the foam control additive, the surfactant and the mar resistance additive are each present in an amount of from about 0.25 to about 2.00 weight percent based on the weight of the blend.

9. The blend of claim 8 further comprising from about 5 to about 20 weight percent of a cosolvent to form a coating composition.

10. The composition of claim 9 wherein the coating composition when applied to a substrate provides a water/interface contact angle of at least about 135 degrees without reducing vapor transmission rates below that of the acrylic resin alone.

11. The composition of claim 10 wherein the coating composition when applied to a substrate has a moisture vapor transmission rate up to 50% higher than a coating composed of just the acrylic resin.

12. The composition of claim 9 wherein the cosolvent is selected from the group consisting of ethylene glycol mono butyl ether, texanol, butyl carbitol, 1-butoxy-2-propanol, 1-propoxy-2-propanol, and mixtures thereof.

13. The composition of claim 9 having a VOCs of about 50 g/l or less.

14. The composition of claim 9 wherein the coating composition provides a coefficient of friction (C.O.F.) of from about 0.5 to about 0.8 when applied to a substrate.

15. The composition of claim 9 wherein the coating composition can be coated on a substrate selected from the group consisting of concrete, wood, stone, cement, stucco, cement based products and combinations thereof.

16. The composition of claim 9 wherein the coating composition provides hot tire pickup resistance and resistance to solvents, chemicals and household condiments.

17. An intermediate resin blend useful for forming a one-coat composition for coating or sealing a substrate comprising:
- a film forming hydrophobic acrylic resin that cures under ambient conditions via self cross-linking, has an average particle size of less than about 0.1 microns and has a glass transition temperature greater than about 45° C.;
- a water repellency additive comprising silicic acid, diethoxyoctylsilyl trimethylsilyl ester and triethoxyoctylsilane in an amount sufficient to increase both the water repellency and vapor transmission rate of the acrylic resin;
- a plasticizer;
- wherein the intermediate resin blend has a coalescing requirement of from about 5 to about 15 weight percent cosolvent based on the total resin solids weight;
- wherein the blend has a vapor transmission rate greater than that of the acrylic resin alone;

from about 5 to about 20 weight percent of a cosolvent to form a coating composition; and wherein the coating composition is adapted to be coated on a substrate selected from the group consisting of concrete, wood, stone, cement, stucco, cement based products and combinations thereof.

18. The composition of claim 17 wherein the coating composition when applied to a substrate provides a water/interface contact angle of at least about 135 degrees without reducing vapor transmission rates below that of the acrylic resin alone.

19. The composition of claim 18 wherein the coating composition when applied to a substrate has a moisture vapor transmission rate up to 50% higher than a coating composed of just the acrylic resin.

20. The composition of claim 17 wherein the cosolvent is selected from the group consisting of ethylene glycol mono butyl ether, texanol, butyl carbitol, 1-butoxy-2-propanol, 1-propoxy-2-propanol, and mixtures thereof.

21. The composition of claim 17 having a VOCs of about 50 g/l or less.

22. The composition of claim 17 wherein the coating composition provides a coefficient of friction (C.O.F.) of from about 0.5 to about 0.8 when applied to a substrate.

23. The composition of claim 17 wherein the coating composition provides hot tire pickup resistance and resistance to solvents, chemicals and household condiments.

* * * * *